United States Patent
Joseph et al.

(10) Patent No.: US 8,213,968 B1
(45) Date of Patent: Jul. 3, 2012

(54) METHOD AND SYSTEM OF TARGETED ALERT DISTRIBUTION

(75) Inventors: Roy Joseph, Overland Park, KS (US); Douglas A. Johnson, Overland Park, KS (US); Michael E. Williams, Raymore, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 1199 days.

(21) Appl. No.: 12/017,863

(22) Filed: Jan. 22, 2008

(51) Int. Cl.
*H04W 4/00* (2009.01)
*H04M 11/04* (2006.01)

(52) U.S. Cl. .............. 455/466; 455/404.1; 455/412.1; 370/328; 370/338; 370/349

(58) Field of Classification Search ............. 455/466, 455/404.1, 412.1–412.2, 445, 521, 560; 370/328, 370/338, 349
See application file for complete search history.

(56) References Cited

U.S. PATENT DOCUMENTS

| | | | |
|---|---|---|---|
| 6,882,837 B2 * | 4/2005 | Fernandez et al. | 455/404.1 |
| 7,194,249 B2 | 3/2007 | Phillips et al. | |
| 2005/0227672 A1 | 10/2005 | Lauzon et al. | |
| 2006/0223492 A1 | 10/2006 | Chin et al. | |
| 2006/0240821 A1 * | 10/2006 | Chien | 455/433 |
| 2007/0139182 A1 | 6/2007 | O'Connor et al. | |
| 2007/0265003 A1 * | 11/2007 | Kezys et al. | 455/435.1 |
| 2007/0286134 A1 * | 12/2007 | Kirke | 370/338 |

* cited by examiner

*Primary Examiner* — Marcos Torres

(57) ABSTRACT

A method and system for distributing messages to mobile stations operating in a picocell network that is communicatively coupled to a macrocell network. In one example, the macrocell network may receive a message that includes an identifier of the picocell network and send the message to the picocell network. In turn, the picocell network may receive the message, responsively identify each mobile station operating in the picocell network, and then send a given instance of the message to the identified mobile stations. In another example, a macrocell network may maintain data indicating an identifier of each mobile station operating in the picocell network, receive a message that includes an identifier of the picocell network, use the maintained data to identify each mobile station operating in the picocell network, and send a given instance of the message to the identified mobile stations via the picocell network.

20 Claims, 5 Drawing Sheets

US 8,213,968 B1

METHOD AND SYSTEM OF TARGETED ALERT DISTRIBUTION

FIELD OF THE INVENTION

The present invention relates to distributing alerts, and more particularly to distributing targeted alerts to mobile stations operating in picocell networks.

BACKGROUND

The art and popularity of alert distribution has grown significantly over recent years. Alert distribution allows an entity, such as a government agency or a business, to notify people in real-time of important information. As one example, the important information may be information related to an event that impacts public safety, such as severe weather, criminal activity (e.g., terrorist attack, child abduction, etc.), and/or national disaster. As another example, the important information may be internal business information. Often times, this important information is relevant only to particular locations (e.g., buildings) and/or particular people at those locations.

Existing alert distribution systems, such as the United States Emergency Alert System (EAS), typically use broadcast media, such as television or radio, to distribute alerts to the public. As such, these alerts systems may only be able to target larger geographic regions, such as cities, counties, or states, for distribution of alerts. More recently, alert systems have also begun distributing more individualized alerts, such as emails or text messages, to registered users. However, these alert systems require users to manually pre-register, and also may not take location into account when distributing the alerts. Accordingly, an improved alert system that distributes targeted alerts to particular locations and particular people at those locations, who are most affected by the information embodied in the alerts, is desirable.

OVERVIEW

In one embodiment, the present invention may take the form of a method for distributing messages to mobile stations operating in a first access network (e.g., a picocell network) that is communicatively coupled to a second access network (e.g., a macrocell network). The method may include (a) receiving in the second access network a message from an entity, wherein the message includes an identifier of the first access network, (b) sending the message from the second access network to the first access network, (c) receiving the message in the first access network and responsively identifying each mobile station operating in the first access network, and (d) sending a given instance of the message to the identified mobile stations.

In another embodiment, the present invention may take the form of a method for distributing messages to mobile stations operating in a first access network (e.g., a picocell network) that is communicatively coupled to a second access network (e.g., a macrocell network). The method may include (a) maintaining in the second access network data indicating an identifier of each mobile station operating in the first access network, (b) receiving in the second access network a message from an entity, wherein the message includes an identifier of the first access network, (c) in response to receiving the message, using the maintained data to identify each mobile station operating in the first access network, and (d) sending a given instance of the message from the second access network, via the first access network, to the identified mobile stations.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

DETAILED DESCRIPTION

Figure 1:
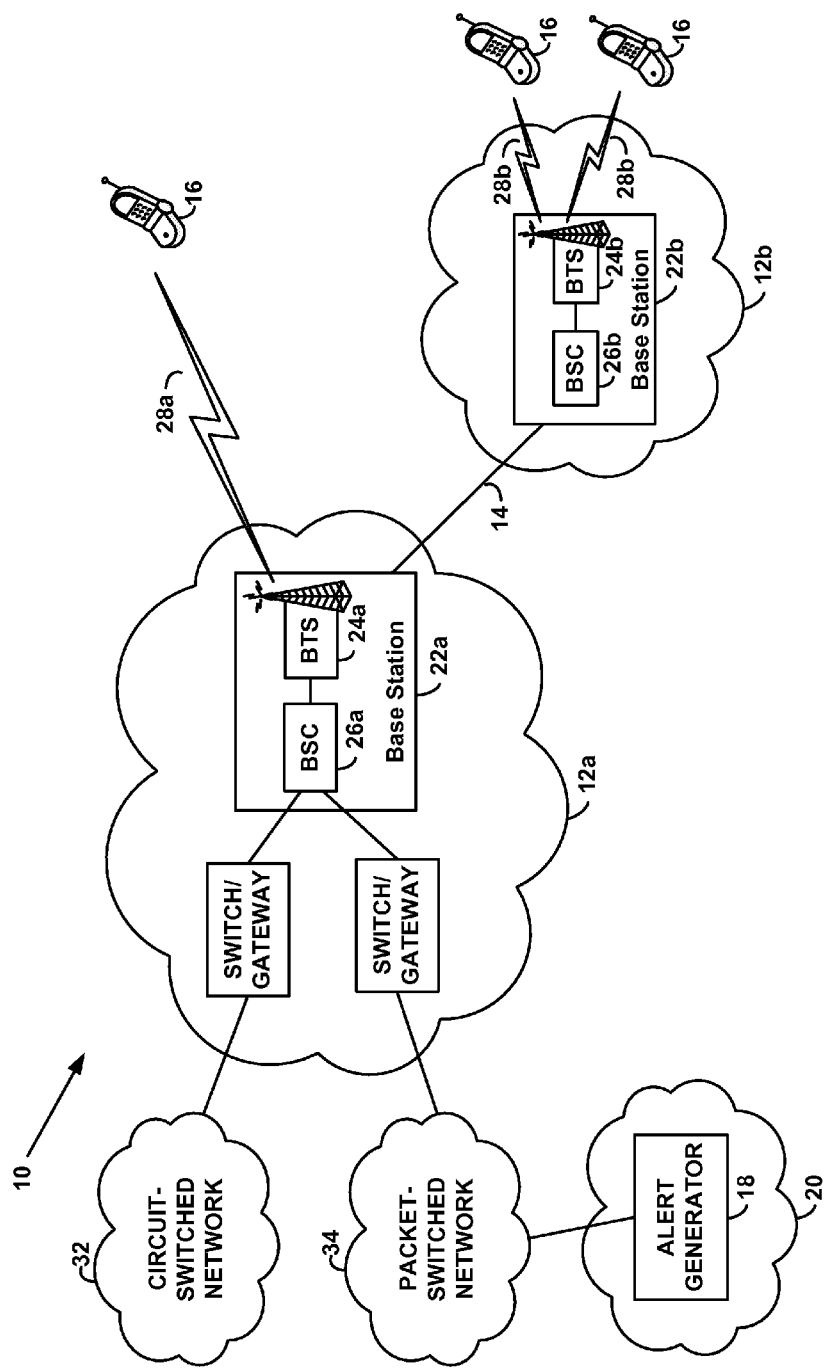
FIG. 1 is a simplified block diagram of a communication system in which an exemplary embodiment of the invention can be implemented.

Referring to the drawings, FIG. 1 is a simplified block diagram of a communication system 10 in which an exemplary embodiment of the invention can be implemented. It should be understood, however, that this and other arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic. For instance, various functions may be carried out by a processor executing a set of machine language instructions stored in memory.

As shown, the system 10 includes at its core a first access network 12a that is communicatively coupled to a second access network 12b via a communication link 14. The first access network 12a serves wireless communication devices (WCDs) 16, such as cellular telephones and personal digital assistants (PDAs), operating in a first coverage area (e.g., a cell and perhaps sectors), and the second access network 12b serves WCDs 16 operating in a second coverage area (e.g., a cell and perhaps sectors). Preferably, the first coverage area will be larger than the second coverage area, such that the first access network 12a is considered a "macrocell network" and the second access network 12b is considered a "picocell network." For example, the first coverage area may encompass an entire city, whereas the second coverage area may encompass a few buildings. As such, the macrocell network 12a may provide the primary wireless coverage for the system 10, whereas the picocell network 12b may provide more localized coverage where the macrocell network's coverage is poor and/or there are high numbers of users. (Although FIG. 1 depicts the macrocell network 12a communicatively coupled to a single picocell network, it should be understood that the macrocell network 12a may communicatively couple to other picocell networks as well).

Within this configuration, the picocell network 12b will preferably facilitate communication between WCDs 16 operating in the picocell network's coverage area and the macrocell network 12a, which in turn provides connectivity to one or more transport networks. For example, the picocell network 12b may receive communications from WCDs 16 operating in the picocell network's coverage area and then responsively send the communications, via the communication link 14, to the macrocell network 12a. As another example, the picocell network 12b may receive communications from the macrocell network 12a and responsively send the communications, via the communication link 14, to WCDs 16 operating in the picocell network's coverage area. As such, the picocell network 12b may effectively function to extend the macrocell network's coverage area into areas that the macrocell network 12a may otherwise not be able to provide service.

As shown, the macrocell network 12a may include, among other entities, a macrocell base station 22a that includes a macrocell base transceiver station (BTS) 24a and a macrocell base station controller (BSC) 26a. (Although FIG. 1 depicts the macrocell network 12a as including one base station 22a with a single BTS 24a and a single BSC 26a, it should be understood that the macrocell network 12a may include multiple base stations 22a, and that each base station 22a may include multiple BTSs 24a and/or BSCs 26a). The macrocell BTS 24a may radiate to define one or more radio frequency (RF) air interfaces 28a over which WCDs 16 (and perhaps the picocell BTS 24b) can communicate with the macrocell network 12a. In this respect, the macrocell BTS's one or more air interfaces 28b define the macrocell network's coverage area. The macrocell BTS 24a may then be coupled or integrated with the macrocell BSC 26a, which may control functions of the macrocell BTS 24a and aspects of operation of the macrocell BTS's air interface(s) 28a, such as channel assignment and handoff.

The macrocell BSC 26a may also communicatively couple to one or more transport networks. For example, as shown, the macrocell BSC 26a may couple to a first switch/gateway, such as a mobile switching center (MSC), which may provide connectivity with a circuit-switched network 32 (e.g., the public-switched telephone network (PSTN)). Additionally or alternatively, the macrocell BSC 26a may couple to a second switch/gateway, such as a packet data serving node (PDSN), which may provide connectivity with a packet-switched network 34 (e.g., the Internet).

As shown, the picocell network 12b may include, among other entities, a picocell base station 22b that includes a picocell BTS 24b and a picocell BSC 26b. (Although FIG. 1 depicts the picocell network 12b as including one base station 22b with a single BTS 24b and a single BSC 26b, it should be understood that the picocell network 12b may include multiple base stations 22b, and that each base station 22b may include multiple BTSs 24b and/or BSCs 26b). The picocell BTS 24b may radiate to define one or more RF air interfaces 28b over which WCDs 16 can communicate with the picocell network 12b. In this respect, the picocell BTS's one or more air interfaces 28b define the picocell network's coverage area. The picocell BTS 24b may then be coupled or integrated with the picocell BSC 26b, which may control functions of the picocell BTS 24b and aspects of operation of the picocell BTS's air interface(s) 28a, such as channel assignment and handoff.

As described above, the macrocell network 12a is communicatively coupled to the picocell network 12b via the communication link 14. More particularly, as shown, the macrocell base station 22a is communicatively coupled to the picocell base station 22b via the communication link 14. In one example, the communication link 14 may be an air-interface link that communicatively couples the macrocell BTS 24a and the picocell BTS 24b. In this respect, the air-interface link 14 may be an air interface 28b defined by the macrocell BTS 24a. In another example, the communication link 14 may be a wired link, such as a T1/E1 link, that communicatively couples the macrocell BSC 26b and the picocell BSC 26b. Other options for coupling the access networks 12a and 12b may exist as well.

The air interfaces described above, including the macrocell BTS's air interface(s) 28a and the picocell BTS's air interface(s) 28b, may carry communications according to any of a variety of protocols. For example, the air interfaces may carry communications according to CDMA (e.g., 1×RTT, IS-856), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, and other protocols now known or later developed. Depending on the protocol employed, the air interfaces may also be divided into a plurality of channels. For example, the air interfaces may include forward-link channels (e.g., paging channels, forward-traffic channels, etc.) and reverse-link channels (e.g., access channels, reverse-traffic channels, etc.).

As shown, the system 10 may further include an alert generator 18 that is owned and operated by an entity 20, such as a government agency (e.g., U.S. Department of Homeland Security, National Oceanic and Atmospheric Administration (NOAA), local law enforcement agency, etc.), a business (e.g., a fortune 500 company), and/or any other entity that wishes to distribute targeted alerts. In this respect, the alert generator 18 may be located on the entity's local area network (LAN), and may couple to the macrocell network 12a via one or more networks, including the packet-switched network 34. Further, the alert generator 18 may communicatively couple to one or more entities of the macrocell network 12a, including the base station 22 and/or a Short Message Service (SMS) server (not shown) for instance.

The alert generator 18 may function to generate messages intended for WCDs 16 operating in one or more targeted picocell networks, such as the picocell network 12b. (It should be understood that the alert generator 18 may also perform other functions, such as tracking data about WCDs 16 operating in the system). The generated messages will preferably be text-based messages, such SMS messages and/or electronic mail (e-mail) messages. Further, the generated messages will preferably include (a) an identifier of one or more targeted picocell networks such as the picocell network 12b (e.g., in a custom header of the message), and (b) important information that the entity 20 wishes to distribute to users of the WCDs 16 operating in the targeted picocell network 12b (e.g., in a body of the message). Additionally, the generated messages may include an identifier of one or more groups of targeted WCDs 16. As one example, the alert generator 18 may be one or more programmable computers arranged to carry out the above functions.

Figure 2:
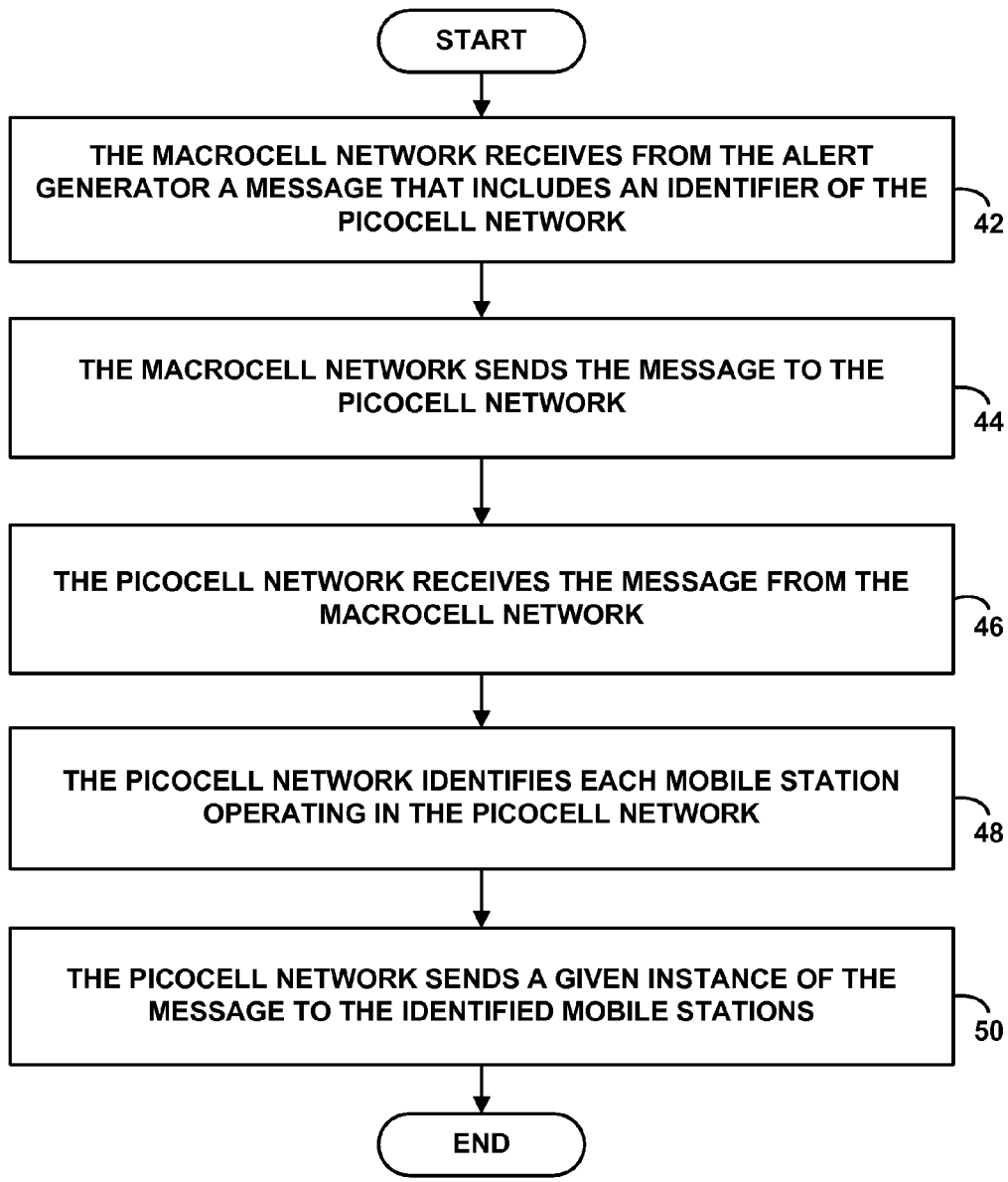
FIG. 2 is a flow chart depicting a method for distributing messages to mobile stations operating in the picocell network of the system of FIG. 1, according to one exemplary embodiment of the present invention.

FIG. 2 is a flow chart depicting a method for distributing messages to WCDs 16 operating in the picocell network 12b of the system 10, according to one exemplary embodiment of the present invention. As described above, the macrocell network 12a communicatively couples to the picocell network 12b via the communication link 14. Additionally, the macrocell network 12a communicatively couples to the alert generator 18, which may be owned and operated by the entity 20, via the packet-switched network 34.

At step 42, the macrocell network 12a may receive from the alert generator 18 a message that includes an identifier of the picocell network 12b. (Although the message described herein includes an identifier of a single picocell network, it should be understood that the message may include identifiers of multiple picocell networks that are targeted to receive the message). The alert generator 18 may generate and send the message either automatically or in response to some triggering event (e.g., a request by the entity's personnel). The base station 22a of the macrocell network 12a, and preferably the macrocell BSC 26a, will receive the message from the alert generator 18. As described above, the message may be an SMS message or e-mail message. Further, the message may consist of a custom header, which includes the picocell-network identifier, and a body, which includes important information that the entity 20 wishes to distribute to the WCDs 16 operating in the targeted picocell network 12b (and the users thereof).

Preferably, the identifier of the picocell network 12b will represent a location of the picocell network 12b. In this respect, the entity 20 may use the picocell-network identifier to target one or more particular picocell networks, and the WCDs 16 operating therein, for receipt of the message. As one example, the identifier of the picocell network 12b may include a Geospatial Entity Object Code (Geocode), which is an identifier that represents a geospatial coordinate measurement of the picocell network 12b. In this respect, the Geocode may include, among other attributes, a Geocode format registry number, a latitude, and a longitude for the picocell network 12b. As another example, the identifier of the picocell network 12b may include a building identifier, which represents a particular building in which the picocell network 12b is located. The format and substance of the building identifier may be pre-defined by the entity 20. Preferably, the building identifier will be an alpha-numeric code (e.g., "Building A"). Other examples of the picocell-network identifier may exist as well.

In addition to the picocell-network identifier, the message may also include an identifier of a given group of WCDs 16. (Although the message described herein includes an identifier of a single group of WCDs 16, it should be understood that the message may include identifiers of multiple groups of WCDs 16 that are targeted to receive the message). Preferably, the entity 20 owning and operating the alert generator 18 will pre-select the WCDs 16 to be included in the given group, and will then assign an identifier to the given group that correlates to an identifier of each WCD 16 selected for the given group. The entity 20 may then use the group identifier to target particular WCDs 16 within a targeted picocell network for receipt of the message and/or preclude particular WCDs 16 within the targeted picocell network from receiving the message. As examples, the given group may consist of WCDs 16 associated with a particular business department (e.g., a marketing group), WCDs 16 identified on a predefined whitelist or blacklist, and/or WCDs 16 associated or grouped together in some other fashion. As with the building identifier, the format and substance of the group identifier may be pre-defined by the entity 20. Preferably, the group identifier will be an alpha-numeric code (e.g., "Marketing Group"). Other examples of the group identifier may exist as well.

At step 44, the macrocell network 12a may send the message to the picocell network 12b. For example, if the communication link 14 is a wired link coupling the macrocell BSC 26a and the picocell BSC 26b, then the macrocell BSC 26a may send the message directly to the picocell BSC 26b via the wired link 14. As another example, if the communication link 14 is an air-interface link coupling the macrocell BTS 24a and the picocell BTS 24b, then the macrocell BSC 26a may first send the message to the macrocell BTS 24a, which may in turn send the message over the air-interface link 14 to the picocell BTS 24b. In this respect, if the macrocell network 12a includes multiple BTSs 24b, the macrocell network 12a may maintain data indicating (a) an identifier of each picocell network communicatively coupled to the macrocell network 12a and (b) an identifier of the particular macrocell BTS 24a coupled to each picocell network. Other examples for sending the message from the macrocell network 12a to the picocell network 12b may exist as well.

At step 46, the picocell network 12b may receive the message from the macrocell network 12a. For example, if the communication link 14 is a wired link coupling the macrocell BSC 26a and the picocell BSC 26b, then the picocell BSC 26b may receive the message directly from the macrocell BSC 26a over the wired link 14. As another example, if the communication link 14 is an air-interface link coupling the macrocell BTS 24a and the picocell BTS 24b, then the picocell BTS 24b may receive the message from the macrocell BTS 24a over the air-interface link 14, and the picocell BTS 24b may in turn send the message to picocell BSC 26b. Other examples for receiving the message in the picocell network 12b may exist as well.

At step 48, in response to receiving the message, the picocell network 12b may identify each WCD 16 operating in the picocell network 12b. In this respect, the picocell network 12b will preferably maintain data indicating an identifier of each WCD 16 operating in the picocell network 12b, which the picocell network 12b may use to identify the WCDs 16 operating in the picocell network 12b. For example, the picocell network 12b may maintain a list of International Mobile Station Identifiers (IMSIs), Mobile Identification Numbers (MINs), and/or Network Access Identifiers (NAIs) for the WCDs 16 operating in the picocell network 12b. In another example, if the picocell network 12b includes multiple picocell BTSs 24b, the picocell network 12b may maintain data indicating an identifier of the particular picocell BTS 24b serving each WCD 16 operating in the picocell network 12b.

The picocell network 12b may maintain this data at the picocell BTS 24b, the picocell BSC 26b, and/or some other data storage entity residing in or accessible by the picocell network 12b. Further, the picocell network 12b will preferably update this data in real-time as WCDs 16 enter and leave the picocell network 12b. Further yet, the picocell network 12b may send this data to the macrocell network 12a, either periodically or in response to some triggering event (e.g., a request from the macrocell network 12a and/or a change in the data).

At step 50, the picocell network 12b may then send a given instance of the message to the identified WCDs 16. In one aspect, the picocell network 12b may send a given instance of the message to each identified WCD 16. For example, for each identified WCD 16, the picocell base station 22b may (a) generate a given instance of the message addressed to the identified WCD 16, and then (b) send the given instance to the identified WCD 16 over a forward-traffic channel of a picocell BTS's air interface 28b, which the picocell base station 22b previously assigned to the identified WCD 16. As a result, the message may be received by all WCDs 16 operating in the picocell network's coverage area.

In another aspect, the picocell network 12b may send a given instance of the message to a subset of the identified WCDs 16. For example, the picocell network 12b may use information included in the message, such the previously described identifier of a given group, to select the subset of the identified WCDs 16 to which the message will be sent. In this respect, the picocell network 12b may maintain data indicating an identifier of at least one given group of WCDs 16, which then correlates to an identifier of each WCD 16 in the given group. As described above, the identifier and the WCDs 16 of the given group may be pre-defined by the entity 20. The picocell network 12b may maintain this data at the picocell BTS 24b, the picocell BSC 26b, and/or some other data storage entity residing in or accessible by the picocell network 12b.

Using the group identifier in the message and this maintained group data, the picocell network 12b may then determine, for each identified WCD 16, if the identified WCD 16 is in the given group of WCDs 16. For example, the picocell network 12b may determine if the identifier of the given group of WCDs 16 correlates with an identifier of the identified WCD 16. If so, picocell network 12b will send a given instance of the message to the identified WCD 16. If not, picocell network 12b will not send a given instance of the message to the identified WCD 16. As a result, the message may only be received by particular WCDs 16 operating in the picocell network's coverage area, which were previously targeted by the entity 20.

Figure 3:
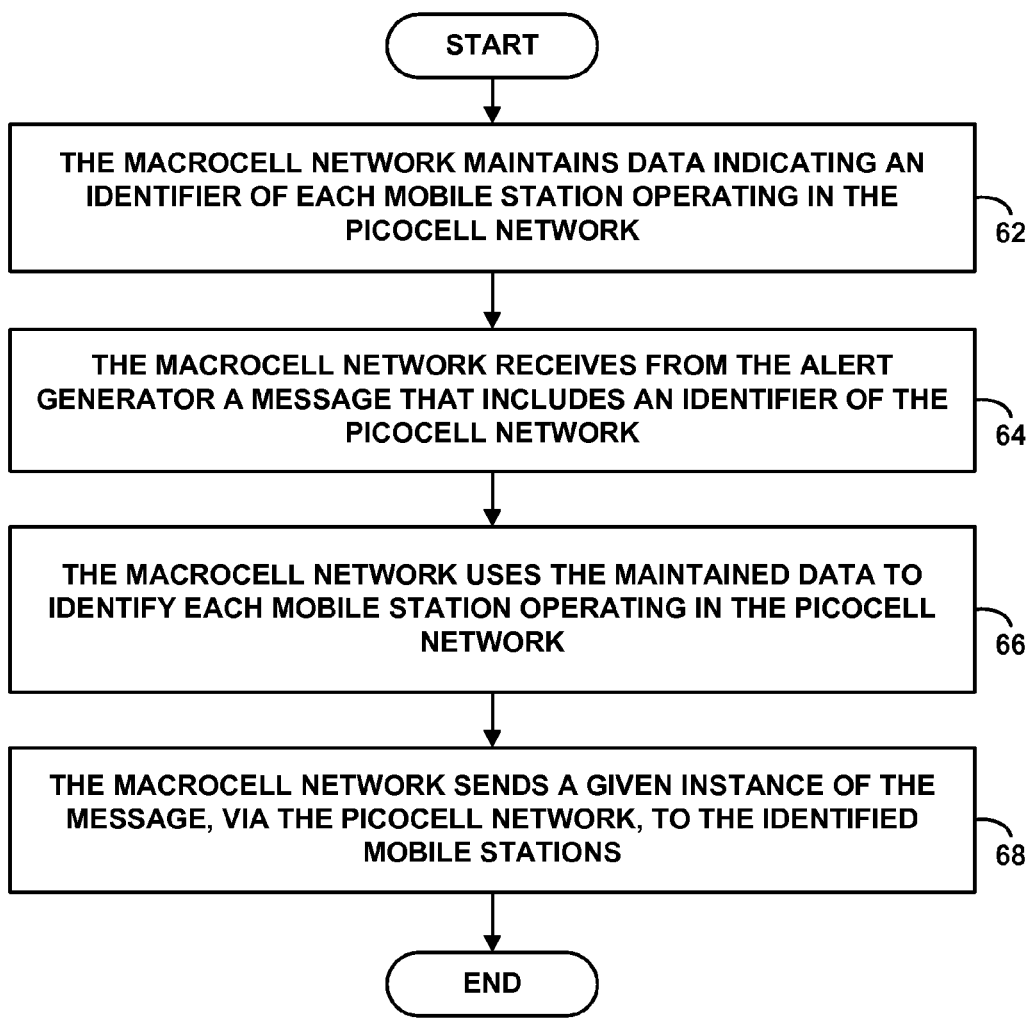
FIG. 3 is a flow chart depicting a method for distributing messages to mobile stations operating in the picocell network of the system of FIG. 1, according to another exemplary embodiment of the present invention.

FIG. 3 is a flow chart depicting a method for distributing messages to WCDs 16 operating in the picocell network 12b of the system 10, according to another exemplary embodiment of the present invention. As described above, the macrocell network 12a communicatively couples to the picocell network 12b via the communication link. Additionally, the macrocell network 12a communicatively couples to the alert generator 18, which may be owned and operated by the entity 20, via the packet-switched network 34.

At step 62, the macrocell network 12a may maintain data indicating an identifier of each WCD 16 operating in the picocell network 12b. More particularly, the macrocell network 12a may receive from the picocell network 12b data indicating an identifier of each WCD 16 operating in the picocell network 12b, and the macrocell network may then store the received data, along with an identifier of the picocell network 12b, for future reference. In this respect, the macrocell network 12a will preferably receive updates to this data from the picocell network 12b in real-time as WCDs 16 enter and leave the picocell network 12b. Additionally or alternatively, the macrocell network 12a may receive updates to this data from the picocell network 12b periodically or in response to some other triggering event (e.g., a request from the macrocell 12b).

In one example, the maintained data may include a list of IMSIs, MINs, and/or NAIs for the WCDs 16 operating in the picocell network 12b. In another example, if the macrocell network 12a includes multiple macrocell BTSs 24a, the macrocell network 12a may maintain data indicating an identifier of the particular macrocell BTS 24a coupled to each picocell network. The macrocell network 12a may maintain this data at the macrocell BTS 24a, the macrocell BSC 26a, and/or some other data storage entity residing in or accessible by the macrocell network 12a.

At step 64, the macrocell network 12a may receive from the alert generator 18 a message that includes an identifier of the picocell network 12b. (Although the message described herein includes an identifier of a single picocell network, it should be understood that the message may include identifiers of multiple picocell networks that are targeted to receive the message). The alert generator 18 may generate and send the message either automatically or in response to some triggering event (e.g., a request by the entity's personnel). As shown, the base station 22a of the macrocell network 12a, and preferably the macrocell BSC 26a, will receive the message from the alert generator 18. As described above, the message may be a SMS message or e-mail message. Further, the message may consist of a custom header, which includes the picocell-network identifier, and a body, which includes important information that the entity 20 wishes to distribute to the WCDs 16 operating in the targeted picocell network 12b (and the users thereof).

As described above, the identifier of the picocell network 12b will preferably represent a location of the picocell network 12b. In this respect, the entity 20 may use the picocell-network identifier to target one or more particular picocell networks, and the WCDs 16 operating therein, for receipt of the message. As one example, the identifier of the picocell network 12b may include a Geocode. As another example, the identifier of the picocell network 12b may include a building identifier, which will preferably be an alpha-numeric code (e.g., "Building A"). Other examples of the picocell-network identifier may exist as well.

In addition to the picocell-network identifier, the message may also include an identifier of a given group of WCDs 16, which will preferably be an alpha-numeric code (e.g., "Marketing Group"). (Although the message described herein includes an identifier of a single group of WCDs 16, it should be understood that the message may include identifiers of multiple groups of WCDs 16 that are targeted to receive the message). As described above, the entity 20 owning and operating the alert generator 18 will preferably pre-select the WCDs 16 to be included in the given group, and will then assign the identifier to the given group that correlates to an identifier of each WCD 16 selected for the given group. The entity 20 may then use the group identifier to target particular WCDs 16 within a targeted picocell network for receipt of the message and/or preclude particular WCDs 16 within the targeted picocell network from receiving the message. As examples, the given group may consist of WCDs 16 associated with a particular business department (e.g., a marketing group), WCDs 16 identified on a predefined whitelist or blacklist, and/or WCDs 16 associated or grouped together in some other fashion.

At step 66, in response to receiving the message, the macrocell network 12a may use the maintained data to identify each WCD 16 operating in the picocell network 12b. For example, the macrocell network 12a may look up the identifier of the picocell network 12b in the maintained data. The macrocell network 12a may then access the identifier of each WCD 16 operating in the picocell network 12b.

At step 68, the macrocell network 12a may then send a given instance of the message, via the picocell network 12b, to the identified WCDs 16. In this respect, the picocell network 12b will receive a given instance of the message addressed to an identified WCD 16 from the macrocell network 12a and then responsively send the message to the identified WCD 16, thus acting as a repeater for the macrocell network 12a. In one aspect, the macrocell network 12a may send a given instance of the message, via the picocell network 12b, to each identified WCD 16. For example, for each identified WCD 16, the macrocell base station 22*a* may (a) generate a given instance of the message addressed to the identified WCD 16, and then (b) send the given instance to the identified WCD 16 over a path that includes the communication link 14, the picocell base station 22*b*, and a forward-traffic channel on a picocell BTS's air interface 28*b*, which the picocell base station 22*b* previously assigned to the identified WCD 16. As a result, the message may be received by all WCDs 16 operating in the picocell network's coverage area.

In another aspect, the macrocell network 12*a* may send a given instance of the message, via the picocell network 12*b*, to a subset of the identified WCDs 16. For example, the macrocell network 12*a* may use information included in the message, such the previously described identifier of a given group, to select the identified WCDs 16 to which the message will be sent. In this respect, the macrocell network 12*a* may maintain data indicating an identifier of at least one given group of WCDs 16, which then correlates to an identifier of each WCD 16 in the given group. As described above, the identifier and the WCDs 16 of the given group may be predefined by the entity 20. The picocell network 12*b* may maintain this data at the picocell BTS 24*b*, the picocell BSC 26*b*, and/or some other data storage entity residing in or accessible by the picocell network 12*b*.

Using the group identifier in the message and this maintained group data, the macrocell network 12*a* may then determine, for each identified WCD 16, if the identified WCD 16 is in the given group of WCDs 16. For example, the macrocell network 12*a* may determine if the identifier of the given group of WCDs 16 correlates with an identifier of the identified WCD 16. If so, macrocell network 12*a* will send a given instance of the message, via the picocell network 12*b*, to the identified WCD 16. If not, picocell network 12*b* will not send a given instance of the message to the identified WCD 16. As a result, the message may only be received by particular WCDs 16 operating in the picocell network's coverage area, which were previously targeted by the entity 20.

Figure 4:
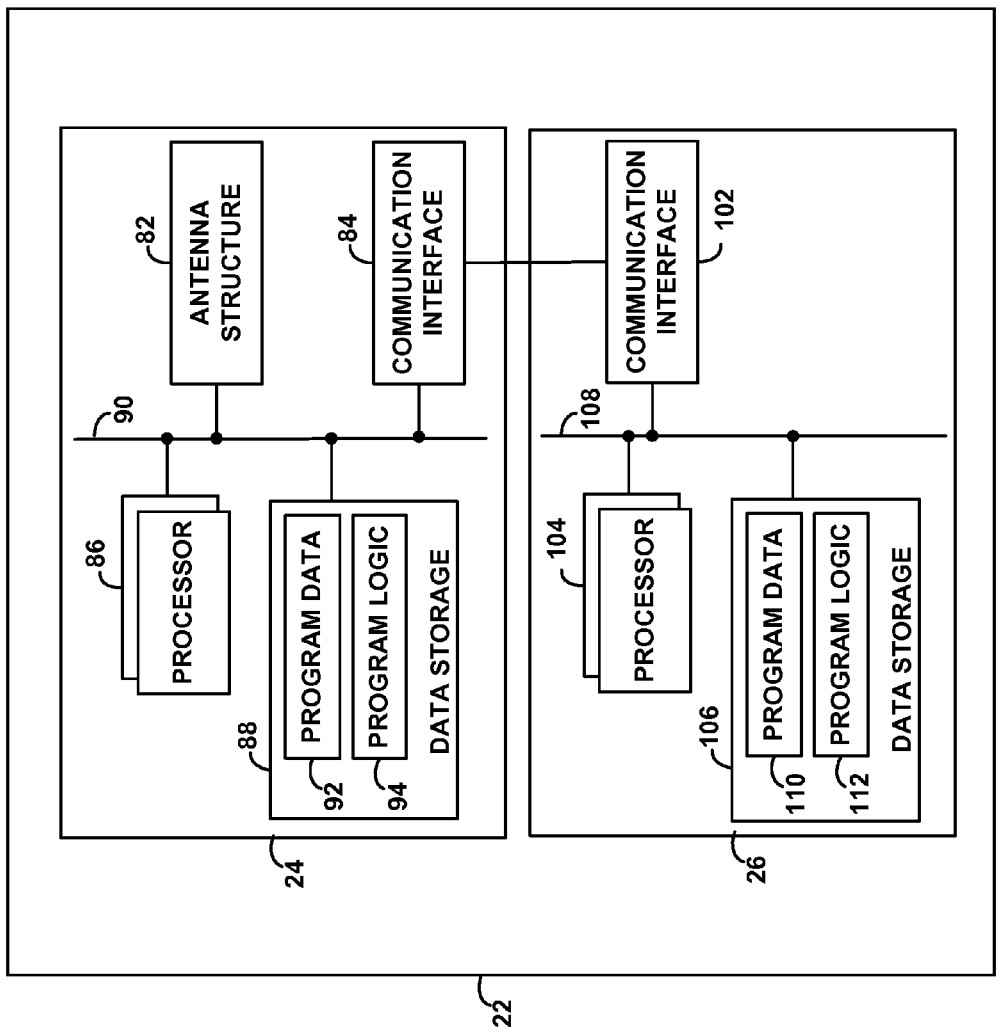
FIG. 4 is a simplified block diagram of an exemplary base station of the system of FIG. 1, showing functional components that can operate to carry out aspects of the present invention.

FIG. 4 is a simplified block diagram of an exemplary base station 22, showing functional components that can operate to carry out aspects of the present invention. As described above and as shown in FIG. 4, the base station 22 will preferably include a BTS 24 coupled to and/or integrated with a BSC 26. The base station 22 of FIG. 4 may be either a macrocell base station 22*a* or a picocell base station 22*b*, depending on the size, power consumption, and/or range of the base station 22.

As shown in FIG. 4, the BTS 24 may include an antenna structure 82, a communication interface 84, a processor 86, and data storage 88, all linked together via a system bus, network, or other connection mechanism 90. The BTS antenna structure 82 may function to radiate one or more RF-radiation patterns that define the one or more air interfaces over which the WCDs 16 (and perhaps other base stations) may communicate with the base station 22. As described above, the BTS's one or more air interfaces may define the BTS's coverage area. Further, the BTS's one or more interfaces may carry communications according to any of a variety of protocols, including CDMA (e.g., 1xRTT, IS-856), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, and other protocols now known or later developed.

The BTS antenna structure 82 may be arranged in various ways. For example, the antenna structure 82 may include one or more antennas. In one respect, the one or more antennas may include one or more omni-directional antennas and/or one or more directional (e.g., sectored) antennas. In another respect, the one or more antennas may include one or more antennas for receiving RF signals and one or more antennas for transmitting RF signals away from the antenna structure 82. Other configurations are also possible.

The BTS communication interface 84 preferably functions to communicatively couple the BTS 24 to the BSC 26. (It should be understood that the communication interface 84 may also communicatively couple the BTS 24 to other entities, such as a data server). As such, the BTS communication interface 84 may take the form of an Ethernet network interface card, a chipset and antenna adapted to facilitate wireless communication according a desired protocol, and/or any other form that provides for wired and/or wireless communication with the BSC 26. Preferably, the BTS communication interface 84 will be a T1/E1 interface. The BTS communication interface 84 may also include multiple communication interfaces, such as one through which the BTS 24 sends data to the BSC 26 and one through which the BTS 24 receives data from the BTS 26. Other configurations are also possible.

The BTS processor 86 may comprise one or more general purpose microprocessors and/or dedicated signal processors. (The term "processor" encompasses either a single processor or multiple processors that could work in combination.) BTS data storage 88, in turn, may comprise memory and/or other storage components, such as optical, magnetic, organic or other memory or disk/disc storage, which can be volatile and/or non-volatile, internal and/or external, and integrated in whole or in part with the BTS processor 86. BTS data storage 88 preferably contains or is arranged to contain (i) program data 92 and (ii) program logic 94. Although these components are described herein as separate data storage elements, the elements could just as well be physically integrated together or distributed in various other ways. In a preferred example, the program data 92 would be maintained in BTS data storage 88 separate from the program logic 94, for easy updating and reference by the program logic 94.

As shown in FIG. 4, the BSC 26 may include a communication interface 102, a processor 104, and data storage 106, all linked together via a system bus, network, or other connection mechanism 108. The BSC communication interface 102 preferably functions to communicatively couple the BSC 26 to other entities and/or networks of the system 10, including the BTS 24. As such, the BSC communication interface 102 may take the form of an Ethernet network interface card, a chipset and antenna adapted to facilitate wireless communication according a desired protocol, and/or any other form that provides for wired and/or wireless communication with the BTS 24 and/or other system entities. In one example, the BSC communication interface 102 may include a T1/E1 interface. The BSC communication interface 102 may also include multiple communication interfaces, such as one communication interface for each entity with which the BSC 26 communicates. Other configurations are also possible.

The BSC processor 104 may comprise one or more general purpose microprocessors and/or dedicated signal processors. (The term "processor" encompasses either a single processor or multiple processors that could work in combination.) BSC data storage 106, in turn, may comprise memory and/or other storage components, such as optical, magnetic, organic or other memory or disk/disc storage, which can be volatile and/or non-volatile, internal and/or external, and integrated in whole or in part with the BSC processor 104. BSC data storage 106 preferably contains or is arranged to contain (i) program data 110 and (ii) program logic 112. Although these components are described herein as separate data storage elements, the elements could just as well be physically integrated together or distributed in various other ways. In a preferred example, the program data 110 would be maintained in BSC data storage 106 separate from the program logic 112, for easy updating and reference by the program logic 112.

Preferably, the BTS processor 86 and data storage 88 and the BSC processor 104 and data storage 106 will work together to carry out functions of the base station 22 according to examples of the present invention, including the functions described with reference to FIG. 2 and/or FIG. 3. In this respect, the BTS processor 86 and/or data storage 88 and the BSC processor 104 and/or data storage 106 may be integrated together in whole or in part. Further, BTS data storage 88 and BSC data storage 106 may contain overlapping and/or complementary program data and program logic, which may be generally referred to as "base-station program data" and "base-station program logic."

Base-station program data may contain information about the BTS 24 and/or BSC 26. For example, base-station program data may contain identifying information for the BTS 24 and/or the BSC 26. As another example, base-station program data may contain identifying information for the air interfaces 28 and corresponding coverage areas of the BTS 24 (e.g., carrier frequency, PN offsets, air-interface protocols etc.). Base-station program data may contain other information about the BTS 24 and/or BSC 26 as well.

Additionally, base-station program data may contain information about the entities and/or networks communicating with the BTS 24 and/or BSC 26. For example, base-station program data may contain an identifier of each WCD 16 operating in the BTS's coverage area (e.g., IMSI, MIN, NAI, etc.). As another example, base-station program data may contain an identifier of each other access network with which the base station 22 is communicatively coupled, such as a picocell-network identifier (e.g., a Geocode or building ID). In conjunction with this data, the base-station program data may also contain identifiers of each WCD 16 operating in those access networks and/or an identifier of particular BTSs communicatively coupled the other access networks. Base-station program data may contain other information about the entities and/or networks with which the base station 22 is communicating as well.

Additionally yet, base-station program data may contain an identifier of at least one given group of WCDs 16, which correlates to identifiers of the WCDs 16 in the given group. As described above, the identifier and the WCDs 16 of the group may be pre-defined by the entity 20. The base station 22 may use this data when it receives a message that includes the identifier of the given group, to select the particular WCDs 16 to which the message will be sent. As examples, the given group may consist of WCDs 16 associated with a particular business department (e.g., a marketing group), WCDs 16 identified on a predefined whitelist or blacklist, and/or WCDs 16 associated or grouped together in some other fashion.

Base station program logic preferably comprises machine-language instructions that may be executed or interpreted by the BTS processor 86 and/or BSC processor 104 to carry out functions according to examples of the present invention, including the functions described with reference to FIG. 2 and/or FIG. 3. It should be understood, however, that the base-station program logic and its associated functions are described herein by way of example only. As such, those skilled in the art will appreciate that other program logic and/or functions may be used instead, some program logic and/or functions may be added, and some program logic and/or functions may be omitted altogether. Further, the various functions described herein can be embodied in software, hardware, and/or firmware.

For example, if the base station 22 is the macrocell base station 12b, the base-station program logic may be executable by the BTS processor 86 and/or BSC processor 104 to receive from the alert generator 18 a message that includes an identifier of the picocell network 12b and responsively send the message to the identified picocell network 12b. As another example, if the base station 22 is the macrocell base station 12b, the base-station program logic may be executable by the BTS processor 86 and/or BSC processor 104 to (a) maintain data indicating an identifier of each WCD 16 operating in the picocell network 12b, (b) receive from the alert generator 18 a message that includes an identifier of the picocell network 12b, (c) use the maintained data to identify each WCD 16 operating in the picocell network 12b, and (d) send a given instance of the message, via the picocell network 12b, to the identified WCDs 16.

As yet another example, if the base station 22 is the picocell base station 12a, the base-station program logic may be executable by the BTS processor 86 and/or BSC processor 104 to (a) receive a message from the macrocell network 12a (b) identifying each WCD 16 operating in the picocell network, and (c) send a given instance of the message to the identified WCDs 16. As a further example, if the base station 22 is the picocell base station 12a, the base-station program logic may be executable by the BTS processor 86 and/or BSC processor 104 to receive from the macrocell network 12a a message addressed to a given WCD 16 and responsively send the message to the WCD 16. Many other examples are possible as well.

Figure 5:
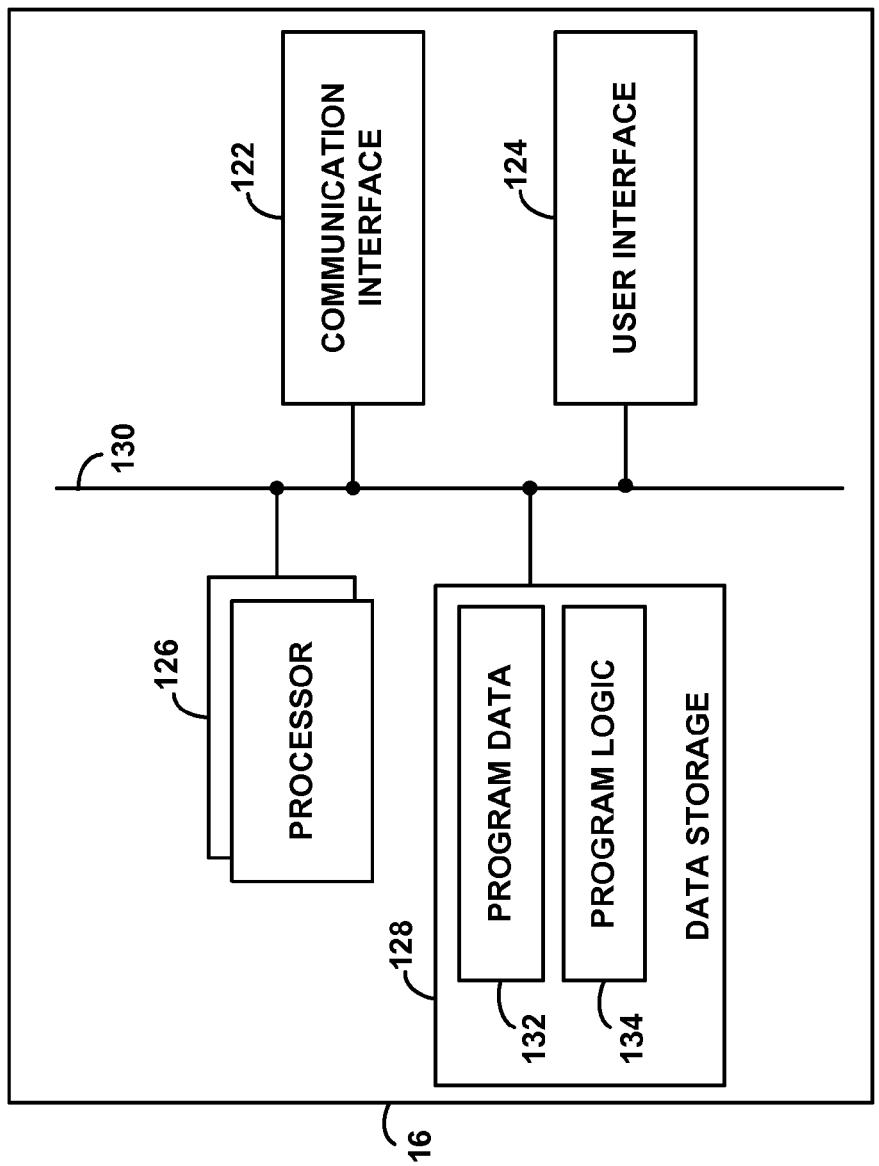
FIG. 5 is a simplified block diagram of an exemplary alert generator of the system of FIG. 1, showing functional components that can operate to carry out aspects of the present invention.

FIG. 5 is a simplified block diagram of an exemplary alert generator 18, showing functional components that can operate to carry out aspects of the present invention. As shown in FIG. 5, the exemplary alert generator 18 may include a communication interface 122, a user interface 124, a processor 126, and data storage 128, all linked together via a system bus, network, or other connection mechanism 130. As described above, the alert generator is preferably owned and operated by the entity 20.

The communication interface 122 preferably functions to communicatively couple the alert generator 18 to other entities and/or networks of the system 10, including the macrocell network 12a. As such, the communication interface 122 may take the form of an Ethernet network interface card, a chipset and antenna adapted to facilitate wireless communication according a desired protocol, and/or any other form that provides for wired and/or wireless communication with other entities. In one example, the communication interface 122 may be a T1/E1 interface. The communication interface 122 may also include multiple communication interfaces, such as one communication interface for each entity with which the alert generator 18 communicates. Other configurations are also possible.

The user interface 124 preferably functions to facilitate user (e.g., entity personnel) interaction with the alert generator 18. The user interface 124 may include a visual interface, a manual interface and/or a speech interface. The visual interface may include a display screen for providing a visual output of the application to a user. The manual interface may include various components for facilitating manual user input, such as a keyboard, a mouse, a multi-functional button, a navigation pad, and/or a scroll wheel. The speech interface may include a speaker for outputting audio signals and a microphone for receiving user speech. The user interface 124 may also include signal processing components, such as A-D and D-A circuitry.

The processor 126 may comprise one or more general purpose microprocessors and/or dedicated signal processors.

(The term "processor" encompasses either a single processor or multiple processors that could work in combination.) Data storage 128, in turn, may comprise memory and/or other storage components, such as optical, magnetic, organic or other memory or disk/disc storage, which can be volatile and/or non-volatile, internal and/or external, and integrated in whole or in part with the processor 126. Data storage 128 preferably contains or is arranged to contain (i) program data 132 and (ii) program logic 134. Although these components are described herein as separate data storage elements, the elements could just as well be physically integrated together or distributed in various other ways. In a preferred example, the program data 132 would be maintained in data storage 134 separate from the program logic 134, for easy updating and reference by the program logic 134.

Program data 132 may contain information about each picocell network to which the entity 20 wants to send targeted alerts, such as the picocell network 12b. As an example, for each picocell network of interest, program data 132 may contain one or more identifiers of the picocell network (e.g., Geocode, Building ID, etc.), which the alert generator 18 may later include in a message targeted for that picocell network. As another example, for each picocell network of interest, program data 132 may contain information about the picocell network layout and/or the WCDs 16 operating in the picocell network. As another example, for each picocell network of interest, program data 132 may contain an identifier of the macrocell network to which the picocell network is communicatively coupled. This picocell-network information may be generated automatically, received from another entity via the communication interface 122, and/or received from a user via the user interface 124. Program data 132 may contain other picocell-network information as well.

Additionally, program data 132 may contain information about the WCDs 16 to which the entity 20 wants to send targeted alerts. As an example, for each WCD 16 of interest, program data 132 may contain one or more identifiers of the WCD 16 (e.g., IMSI, MIN, and/or NAI). As another example, for each WCD 16 of interest, program data 132 may contain an identifier of an access network (e.g., macrocell network 12a or picocell network 12b) in which the WCD 16 is currently operating, as well as identifiers of access networks in which the WCD 16 has previously operated. As yet another example, program data 132 may contain an identifier of at least one given group of WCDs 16, which correlates to identifiers of the WCDs 16 in the given group. In this respect, the given group may consist of WCDs 16 associated with a particular business department (e.g., a marketing group), WCDs 16 identified on a predefined whitelist or blacklist, and/or WCDs 16 grouped together in some other fashion. These identifiers of the given group and corresponding WCDs 16 may be generated automatically, received from another entity via the communication interface 122, and/or received from a user via the user interface 124. Preferably, as described above, the identifier and the WCDs 16 of the groups will be predefined by the entity 20. Program data 132 may contain other mobile-station information as well.

Additionally yet, program data 132 may contain (or be arranged to receive and hold) important information to be included in the body of a message generated by the alert generator 18. As one example, the important information may be information related to an event that impacts public safety, such as severe weather, criminal activity (e.g., terrorist attack, child abduction, etc.), and/or national disaster. As another example, the important information may be internal business information. As above, this information may be generated automatically, received from another entity via the communication interface 122, and/or received from a user via the user interface 124.

Program logic 134 preferably comprises machine-language instructions that may be executed or interpreted by the processor 126 to carry out functions according to examples of the present invention, including the functions described with reference to FIG. 2 and/or FIG. 3. It should be understood, however, that the program logic 134 and its associated functions are described herein by way of example only. As such, those skilled in the art will appreciate that other program logic and/or functions may be used instead, some program logic and/or functions may be added, and some program logic and/or functions may be omitted altogether. Further, the various functions described herein can be embodied in software, hardware, and/or firmware.

For example, the program logic 134 may be executable by the processor 126 to generate and send a message that is targeted to particular picocell networks and/or mobile stations. The message may include one or more picocell identifiers (e.g., Geocode, Building ID, etc.), one or more group identifiers, and important information intended for the WCDs 16 operating in the targeted picocell networks. The program logic 134 may generate and send the message either automatically or in response to some triggering event, such as a request by a user via the user interface 124 and/or the receipt of important information from another entity via the communication interface 122. As another example, the program logic 134 may be executable by the processor 126 to facilitate the creation of groups of WCDs 16. As yet another example, the program logic 134 may be executable by the processor 126 to facilitate the creation of group and building identifiers. As a further example, the program logic 134 may be executable by the processor 126 to track data about WCDs 16 of interest, such as historical data about the access networks in which the WCDs 16 operate. Many other examples are possible as well.

Exemplary embodiments of the present invention have been described above. Those skilled in the art will understand, however, that changes and modifications may be made to the embodiments described without departing from the true scope and spirit of the present invention, which is defined by the claims.

We claim:

1. A method for distributing messages to mobile stations operating in a first access network, wherein the first access network is communicatively coupled to a second access network, the method comprising:

receiving in the second access network a message from an entity that is outside of the first and second access networks, wherein the message includes an identifier of the first access network;

sending the message from the second access network to the first access network;

receiving the message in the first access network;

in response to receiving the message, the first access network identifying each mobile station operating in the first access network; and sending a given instance of the message to one or more of the identified mobile stations.

2. The method of claim 1, wherein the first access network comprises a picocell network, and wherein the second access network comprises a macrocell network.

3. The method of claim 1, further comprising:

maintaining in the first access network data indicating an identifier of each mobile station operating in the first access network, wherein identifying each mobile station operating in the first access network comprises using the maintained data to identify each mobile station operating in the first access network.

4. The method of claim 1, wherein sending a given instance of the message to one or more of the identified mobile stations comprises:
sending a given instance of the message to each identified mobile station.

5. The method of claim 1, wherein sending a given instance of the message to one or more of the identified mobile stations comprises:
sending a given instance of the message to a subset of the identified mobile stations.

6. The method of claim 1, further comprising:
maintaining in the first access network data indicating an identifier of at least one given group of mobile stations, wherein the identifier of the given group of mobile stations correlates to an identifier of each mobile station in the given group, wherein the message further includes the identifier of the given group of mobile stations, and wherein sending a given instance of the message to one or more of the identified mobile stations comprises:
for each identified mobile station, determining if the identified mobile station is in the given group of mobile stations, and:
(i) if so, then sending a given instance of the message to the identified mobile station, and
(ii) if not, then not sending a given instance of the message to the identified mobile station.

7. The method of claim 6, wherein determining if the identified mobile station is in the given group of mobile stations comprises:
determining if the identifier of the given group of mobile stations correlates with an identifier of the identified mobile station.

8. The method of claim 1, wherein the identifier of the first access network comprises one or both of a Geospatial Entity Object Code and a building identifier.

9. The method of claim 1, wherein the first access network comprises a first base transceiver station (BTS), wherein the second access network comprises a second base BTS, and wherein the first access network is communicatively coupled to the second access network over a path that includes an air interface communicatively coupling the first BTS and the second BTS.

10. A method for distributing messages to mobile stations operating in a first access network, wherein the first access network is communicatively coupled to a second access network, the method comprising:
maintaining in the second access network data indicating an identifier of each mobile station operating in the first access network;
receiving in the second access network a message from an entity that is outside of the first and second access networks, wherein the message includes an identifier of the first access network;
in response to receiving the message, using the maintained data to identify each mobile station operating in the first access network; and
sending a given instance of the message from the second access network, via the first access network, to one or more of the identified mobile stations.

11. The method of claim 10, wherein the first access network comprises a picocell network, and wherein the second access network comprises a macrocell network.

12. The method of claim 10, wherein maintaining in the second access network data indicating an identifier of each mobile station operating in the first access network comprises:
receiving, in the second access network from the first access network, data indicating an identifier of each mobile station operating in the first access network; and
storing in the second access network an identifier of the first access network and the received data indicating the identifier of each mobile station operating in the first access network.

13. The method of claim 10, wherein the first access network comprises at least a first base transceiver station (BTS), wherein the second access network comprises at least a second BTS, and wherein the first access network is communicatively coupled to the second access network over a path that includes an air interface communicatively coupling the first BTS and the second BTS.

14. The method of claim 10, wherein sending a given instance of the message from the second access network, via the first access network, to one or more of the identified mobile stations comprises, for a given identified mobile station:
addressing in the second access network a given instance of the message to the given identified mobile station;
sending the given instance of the message from the second access network to the first access network, wherein the first access network receives the given instances of the message and responsively sends the given instance of the message to the given identified mobile station.

15. The method of claim 10, wherein sending a given instance of the message from the second access network, via the first access network, to one or more of the identified mobile stations comprises:
sending given instance of the message from the second access network, via the first access network, to each identified mobile station.

16. The method of claim 10, wherein sending a given instance of the message from the second access network, via the first access network, to one or more of the identified mobile stations comprises:
sending a given instance of the message from the second access network, via the first access network, to a subset of the identified mobile stations.

17. The method of claim 10, further comprising:
maintaining in the second access network an identifier of a given group of mobile stations, wherein the identifier of the given group of mobile stations correlates to an identifier of each mobile station in the given group, wherein the message further includes the identifier of the given group of mobile stations, and wherein sending the message from the second access network, via the first access network, to one or more of the identified mobile stations comprises:
for each identified mobile station, determining if the identified mobile station is in the given group of mobile stations, and:
(i) if so, then sending a given instance of the message from the second access network, via the first access network, to the identified mobile station, and
(ii) if not, then not sending a given instance of the message from the second access network, via the first access network, to the identified mobile station.

18. The method of claim 17, wherein determining if the identified mobile station is in the given group of mobile stations comprises:

determining if the identifier of the given group of mobile stations correlates with an identifier of the identified mobile station.

19. A base station of a first access network comprising:
- a communication interface for communicating with a second access network, wherein the second access network serves mobile stations operating in a coverage area of the second access network;
- a processor;
- data storage; and
- program instructions stored in the data storage and executable by the processor to carry out functions including:
- maintaining in data storage data indicating an identifier of each mobile station operating in the second access network;
- receiving a message from an entity that is outside of the first and second access networks, wherein the message includes an identifier of the second access network;
- in response to receiving the message, using the maintained data to identify each mobile station operating in the second access network; and
- sending a given instance of the message, via the communication interface and the second access network, to one or more of the identified mobile stations.

20. The base station of claim 19, wherein the communication interface for communicating with a second access network comprises:
- an antenna structure for communicating with the second access network via an air interface.

* * * * *